Patented Jan. 7, 1941

2,227,819

UNITED STATES PATENT OFFICE 2,227,819

PROCESS FOR PRODUCING ESTERS OF 2-OXYBUTADIENE-1,3

Herbert Berg and Alfons von Putzer Reybegg, Burghausen, Germany, assignors to Dr. Alexander Wacker Gesellschaft für Elektrochemische Industrie, G. m. b. H., Munich, Bavaria, Germany, a corporation No Drawing. Application September 7, 1938, Serial No. 228,792. In Germany September 25, 1937

13 Claims. (Cl. 260—497)

This invention relates to the production of esters of 2-oxybutadiene-1,3 and has for its object to provide a new and improved process for this purpose.

It is known that acetylene reacts with organic acids to form the corresponding vinyl or ethylidene esters, the reaction taking place both in the liquid and in the gaseous phase.

With the utilization of substituted acetylenes and liquid carboxylic acids according to German Patent #590,237, ketones and the acid anhydrides corresponding to the related acids are produced if the reaction is performed under pressure. Thus, for instance, monovinyl acetylene and acetic acid yield methyl vinyl ketone and acetic anhydride. The esters of the 2-oxybutadiene-1,3 are generated when monovinyl acetylene is subjected to the action of organic acids in the presence of mercury salts and a strong acid while cooling with ice. In such case, however, there are accompanying side reactions which lead to oily polymerization or condensation products, the quantity of which generally exceeds that of the generated oxybutadiene esters. This process is, therefore, technically unsatisfactory and uneconomical.

We have now discovered that the esters of 2-oxybutadiene-1,3 can be produced with satisfactory yields, with an almost complete exclusion of the aforesaid side reactions, when monovinyl acetylene and organic carboxylic acids are caused to react in the vapor phase. The quantitive ratio of the two gases may be varied within wide limits; but for increasing the conversion and for better controlling the reaction a large excess of monovinyl acetylene is advantageously employed, the excess preferably being 400 to 1000% of the theoretical quantity.

The gas mixture is preferably conducted over filling bodies at temperatures such as to avoid polymerization of the oxybutadiene ester product in the heating chamber, as well as the splitting off of the unused monovinyl acetylene; the higher the reaction temperature employed, the greater must be the speed of the gas to control the reaction. In general large quantities of the gaseous reaction mixture, preferably more than 200 litres per litre of catalyst space and per hour, are advantageously employed. The gaseous mixture to be converted is advantageously passed through a pre-heater before it enters the reaction chamber. Moreover, the reaction may be made substantially more uniform by the addition of small amounts of alkaline substances, such as pyridine, piperidine, etc. The reaction may be performed under normal, elevated, or, when necessary or desirable, reduced pressure.

The above mentioned filling bodies are preferably impregnated or coated with salts to increase the conversion, and for this purpose we prefer to use the salts of zinc, cadmium, lead, mercury, magnesium, barium, copper and silver, or mixtures of such salts, particularly the salts of these metals corresponding to the acids used in the reaction. After splitting off of the oxybutadiene ester generated in the reaction the excess reaction components may be returned to the reaction zone for further processing.

Example 1

Stoichiometric quantities of monovinyl acetylene and acetic acid gas are passed over activated carbon impregnated with zinc acetate at temperatures between 130 and 250° C., and at the rate of 55 litres per hour, per litre of catalyst space. In this reaction 2.2% of the acetic acid is converted into 2-acetoxybutadine-1,3. The distilling off of the 2-acetoxybutadine-1,3, having a boiling point of 60–62° C. at 50 mm. of mercury, may be facilitated, for example by the addition of sodium acetate to bind the acetic acid. Upon splitting off the reaction product the unused residual materials are returned to the reaction zone.

Example 2

4 mols monovinyl acetylene and 1 mol acetic acid gas are conducted as in Example 1 at a temperature of 130–250° C. with a gas speed of 40 litres per hour, per litre of catalyst space. A quantity of 12% of acetic acid is converted.

Example 3

4 mols of monovinyl acetylene and 1 mol of acetic acid, containing small quantities of pyridine or piperidine, are processed as in Example 2. 11% of the acetic acid is converted. The course of the reaction is particularly uniform.

Example 4

4 mols of monovinyl acetylene and 1 mol of acetic acid are conducted as in Example 2 over bleaching clay, such as "floridin," "tonsil" or fuller's earth, impregnated with zinc acetate, at temperatures between 120 and 250° C. From 1 to 5% of the acetic acid is converted, according to the quality of the bleaching clay.

Example 5

Monovinyl acetylene and acetic acid are passed, as in Example 2, over pumice stone impregnated with zinc acetate. 4% of the acetic acid is converted.

Example 6

Monovinyl acetylene and acetic acid are conducted, as in Example 2, over activated carbon impregnated with lead acetate. From 0.5 to 1% of the acetic acid is converted.

Example 7

Monovinyl acetylene and acetic acid are conducted, as in Example 2, over activated carbon impregnated with barium acetate, at a temperature between 160 and 250° C. A quantity of 2% of the acetic acid is converted.

Example 8

Monovinyl acetylene and acetic acid are conducted over activated carbon impregnated with cadmium acetate, as in Example 2. A quantity of 6.5% of acetic acid is converted.

Example 9

Monovinyl acetylene and butyric acid, in a ratio of 4:1 mol, are conducted over activated carbon impregnated with zinc butyrate, at a temperature between 160 and 250° C. A quantity of 8% of the butyric acid is converted to the ester of 2-oxybutadiene-1,3, having a boiling point of 59–60° C. at 11 mm. of mercury.

Example 10

A mixture of 8 mols of monovinyl acetylene and 1 mol of acetic acid gas is passed over activated carbon impregnated with zinc acetate, at a temperature of 130–250° C., and at a rate of 28–30 litres per hour, per litre of reaction space. 25% of the acetic acid is converted. As in all the other examples, the yield is practically quantitative with this method of operation.

Example 11

10 mols of monovinyl acetylene and 1 mol of acetic acid are passed into the reaction zone at the rate of 240 litres per hour, per litre of catalyst space, but in other respects according to Example 1 at a temperature of 130–250° C. A quantity of 10% of the acetic acid is converted. The hourly output of the reaction unit is therefore 3.5 times that obtained according to Example 1, and 2.6 times that obtained in Example 10.

The invention claimed is:

1. Process for producing esters of 2-oxybutadiene-1,3, which comprises reacting monovinyl acetylene and a carboxylic acid in the vapor phase at a temperature above 100° C. and low enough to prevent polymerization of the oxybutadiene ester product as well as the splitting off of unused monovinyl acetylene.

2. Process for producing esters of 2-oxybutadiene-1,3, which comprises reacting monovinyl acetylene and a carboxylic acid in the vapor phase at a temperature of 120 to 250° C.

3. Process for producing esters of 2-oxybutadiene-1,3, which comprises reacting monovinyl acetylene and a carboxylic acid in the vapor phase in the presence of a catalyst selected from the group consisting of the salts of zinc, cadmium, lead, mercury, magnesium, barium, copper and silver.

4. Process according to claim 2, in which the reaction is performed in the presence of a basic substance.

5. Process for producing esters of 2-oxybutadiene-1,3, which comprises reacting monovinyl acetylene and a carboxylic acid in the vapor phase in the presence of a basic substance selected from the group consisting of pyridine and piperidine.

6. Process according to claim 2, characterized by the use of a large excess of monovinyl acetylene, the excess being 400 to 1000% of the theoretical quantity.

7. Process according to claim 2, characterized by using at least 200 litres of the gaseous reaction mixture per litre of catalyst space per hour.

8. Process according to claim 2, characterized by preheating the mixture of reaction gases in advance of the reaction zone.

9. Process according to claim 3, in which the reactants are monovinyl acetylene and acetic acid.

10. Process for producing esters of 2-oxybutadiene-1,3, which comprises reacting monovinyl acetylene and acetic acid in the vapor phase at a temperature of 120 to 250° C.

11. Process for producing esters of 2-oxybutadiene-1,3, which comprises reacting monovinyl acetylene and acetic acid in the vapor phase at a temperature of 120 to 250° C. in the presence of a catalyst selected from the group consisting of the salts of zinc, cadmium, lead, mercury, magnesium, barium, copper and silver.

12. Process for producing esters of 2-oxybutadiene-1,3, which comprises reacting monovinyl acetylene and butyric acid in the vapor phase at a temperature of 120 to 250° C.

13. Process for producing esters of 2-oxybutadiene-1,3, which comprises reacting monovinyl acetylene and butyric acid in the vapor phase in the presence of a catalyst at a temperature of 160 to 250° C.

HERBERT BERG.
ALFONS von PUTZER REYBEGG.